United States Patent
Nge et al.

(10) Patent No.: US 10,552,364 B2
(45) Date of Patent: *Feb. 4, 2020

(54) UNIVERSAL SERIAL BUS TYPE-C POWER DELIVERY

(71) Applicant: INTEL CORPORATION, Santa Clara, CA (US)

(72) Inventors: Chee Lim Nge, Hillsboro, OR (US); Basavaraj B. Astekar, Hillsboro, OR (US); Jenn Chuan Cheng, Bayan Lepas FTZ (MY)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/363,851

(22) Filed: Mar. 25, 2019

(65) Prior Publication Data

US 2019/0220435 A1    Jul. 18, 2019

Related U.S. Application Data

(63) Continuation of application No. 15/396,527, filed on Dec. 31, 2016, now Pat. No. 10,241,954.

(51) Int. Cl.
*G06F 13/42* (2006.01)
*G06F 1/26* (2006.01)
*G06F 1/3287* (2019.01)

(52) U.S. Cl.
CPC .......... *G06F 13/4282* (2013.01); *G06F 1/263* (2013.01); *G06F 1/266* (2013.01); *G06F 1/3287* (2013.01); *Y02D 10/14* (2018.01); *Y02D 10/151* (2018.01)

(58) Field of Classification Search
CPC ..... G06F 13/4282; G06F 1/266; G06F 1/3287
See application file for complete search history.

(56) References Cited

U.S. PATENT DOCUMENTS

9,632,555 B2    4/2017 Lester

*Primary Examiner* — Idriss N Alrobaye
*Assistant Examiner* — Richard B Franklin
(74) *Attorney, Agent, or Firm* — International IP Law Group, P.L.L.C.

(57) ABSTRACT

In some examples, a power delivery system includes a primary power path to provide power to a computing system. The power delivery system also includes a bypass power path. A port manager is to disable the primary power path and to enable the bypass power path in response to a dead battery condition.

33 Claims, 6 Drawing Sheets

UNIVERSAL SERIAL BUS TYPE-C POWER DELIVERY

CROSS REFERENCE TO RELATED APPLICATION

The present application claims the benefit of the filing date of U.S. patent application Ser. No. 15/396,527, by Nge et al., entitled "UNIVERSAL SERIAL BUS TYPE-C POWER DELIVERY," filed Dec. 31, 2016, and which is incorporated herein by reference.

TECHNICAL FIELD

This disclosure relates generally to Universal Serial Bus (USB) Type-C port power delivery.

BACKGROUND

The Universal Serial Bus (USB) Power Delivery communication stack is typically partitioned into a hardware portion (i.e. Type-C Port Controller, TCPC) and a software portion (i.e. Type-C Port Manager, TCPM). The Port Manager (TCPM) may need to be active in order to initiate power delivery negotiation. Without power delivery negotiation, the USB VBUS voltage power supply would need to stay at a default state of 5 volts (5V) and limit to less than 15 watts (15 W) capability. Under a dead battery condition, such low 15 W capability from a USB Type-C supply can create challenges relating to powering a mobile device such as a mobile personal computer (mobile PC).

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. In some cases, numbers in the 100 series refer to features originally found in FIG. 1; numbers in the 200 series refer to features originally found in FIG. 2; and so on.

DESCRIPTION OF THE EMBODIMENTS

Some embodiments relate to power delivery. Some embodiments relate to Universal Serial Bus (USB) Type-C port power delivery. Some embodiments relate to power delivery under a dead battery condition (for example, when a battery of the system has been removed, is completely depleted, and/or is unable to power more than a very small portion of the system).

USB Type-C connectors and USB PD (USB power delivery) allow implementation of many things (for example, negotiate for higher voltage, higher current, reconfigure the connector to become a DisplayPort or to implement Thunderbolt signaling). This allows one connector for multiple purposes.

The Universal Serial Bus (USB) Type-C Port Controller Interface Specification defines hardware and software partitioning of a USB-C power delivery communication stack. The USB type-C port controller interface specification describes a hardware Type C port controller (TCPC) and a software Type C port manager (TCPM). The port manager (TCPM) is active in order to initiate power delivery negotiation. Without power delivery negotiation, in order to charge a mobile device such as a mobile personal computer (mobile PC), the USB VBUS voltage power supply, which has a limited capability of less than 15 watts (15 W) would need to stay at a default state of 5 volts (5V). However, challenges arise in initiating USB power delivery negotiation under a dead battery condition.

The Type-C port controller interface describes one possible partitioning of hardware and software. Some embodiments relate to implementations using a Type-C Port Controller Interface. However, some embodiments are not limited to that interface, and can relate to implementations involving partitioning software separately (for example, partitioning TCPM software separately). In some embodiments, a port controller (such as a TCPC) can be implemented in hardware and a port manager (such as a TCPM) can be implemented in software. However, some embodiments include other implementations.

In some embodiments, the port manager and/or firmware that the port manager needs to function may reside in the main system for security reasons, so challenges may exist in accessing the port manager and/or firmware from the main system when the battery is dead, completely depleted, etc. In some embodiments, the main system can include a host processor, a host chipset, memory and/or storage. In some embodiments, the main system can include an SoC (system on a chip), memory, and/or storage.

In order to increase security, simplify a manufacturing process, and/or minimize cost, a USB Type C port manager might only access non-volatile memory and load software through the main system. As part of a boot process of the port manager, the main system may need to be powered. As a result, in order to power the main system and/or to supply an inrush current for various voltage regulators powering the main system, an initial peak power may need to be high. For example, in the case of a master attached flash, an SoC (system on a chip) may need to be powered before a controller (for example, an embedded controller on the motherboard of the main system) can load its software. For example, in some embodiments, master attached flash sharing may be implemented using eSPI (Enhanced Serial Peripheral Interface), for example, where the flash component is attached to the host chipset and the embedded controller (for example, a port manager such as a USB Type C port manager or TCPM) operates as an eSPI slave allowed to access the shared flash component. However, the shared flash is only accessible to the embedded controller after the host chipset (which is part of the main system) is enabled.

Additionally, when a power delivery source is accepted and ready to ramp voltage and provide a higher power, a sink may be required to enter a standby mode (for example, as a part of a USB power delivery specification). USB sink standby mode sets a maximum power through the USB Type-C connector to be less than 2.5 watts (less than 2.5 W). This sink standby mode can be met if the TCPM is powered through the USB-C connector, but may not be met if the main system is also powered for a boot purpose. In a dead battery condition, the only power source of the sink may be through the USB-C connector.

In some embodiments, during a dead battery condition, sink standby power needs can be met even when a port manager such as a TCPM needs the main system to be powered in order to load software.

In some embodiments, under a dead battery condition where the USB-C voltage VBUS is the only input power source, a bypass power path can be used to supply power to the port manager (for example, to supply power to the TCPM). This may be implemented in order to maintain power states. The bypass power path can be provided in addition to a primary power path that may be used to supply power to the main system (for example, for a boot process).

In some embodiments, a primary power path can be used to initially power up the main system for boot, and can allow the port manager (for example, TCPM) to load software to the main system. In some embodiments, a bypass power path can be controlled by the port manager (for example, by the TCPM). In some embodiments, the bypass power path can be turned on when the system needs to enter a sink standby mode during a dead battery condition situation. The bypass power path can be turned off when primary power in unavailable in order to reduce power loss. In some embodiments, since the bypass power path supplies power to the port manager (for example, to the TCPM) instead of to the main system, a total power drawn by the USB-C connector can be reduced. In some embodiments, this reduction of total power drawn by the USB-C connector is reduced to meet the USB sink standby power requirement (that is, less than 2.5 W).

One option to a dead battery condition is to allow the port manager (for example, TCPM) to access non-volatile memory without relying on the main system. However, only allowing the main system to access the non-volatile memory provides higher security, ease of manufacturing (since several steps of loading software would not be necessary), and cost reduction, which would all be reduced if the port manager is allowed to access non-volatile memory without relying on the main system.

Another option to a dead battery condition is to manage the power drawn by the main system to be less than the USB sink standby power limit of 2.5 W. However, this is a challenging option since the charger has a high ripple current, and since there are many components off the main system.

Figure 1:
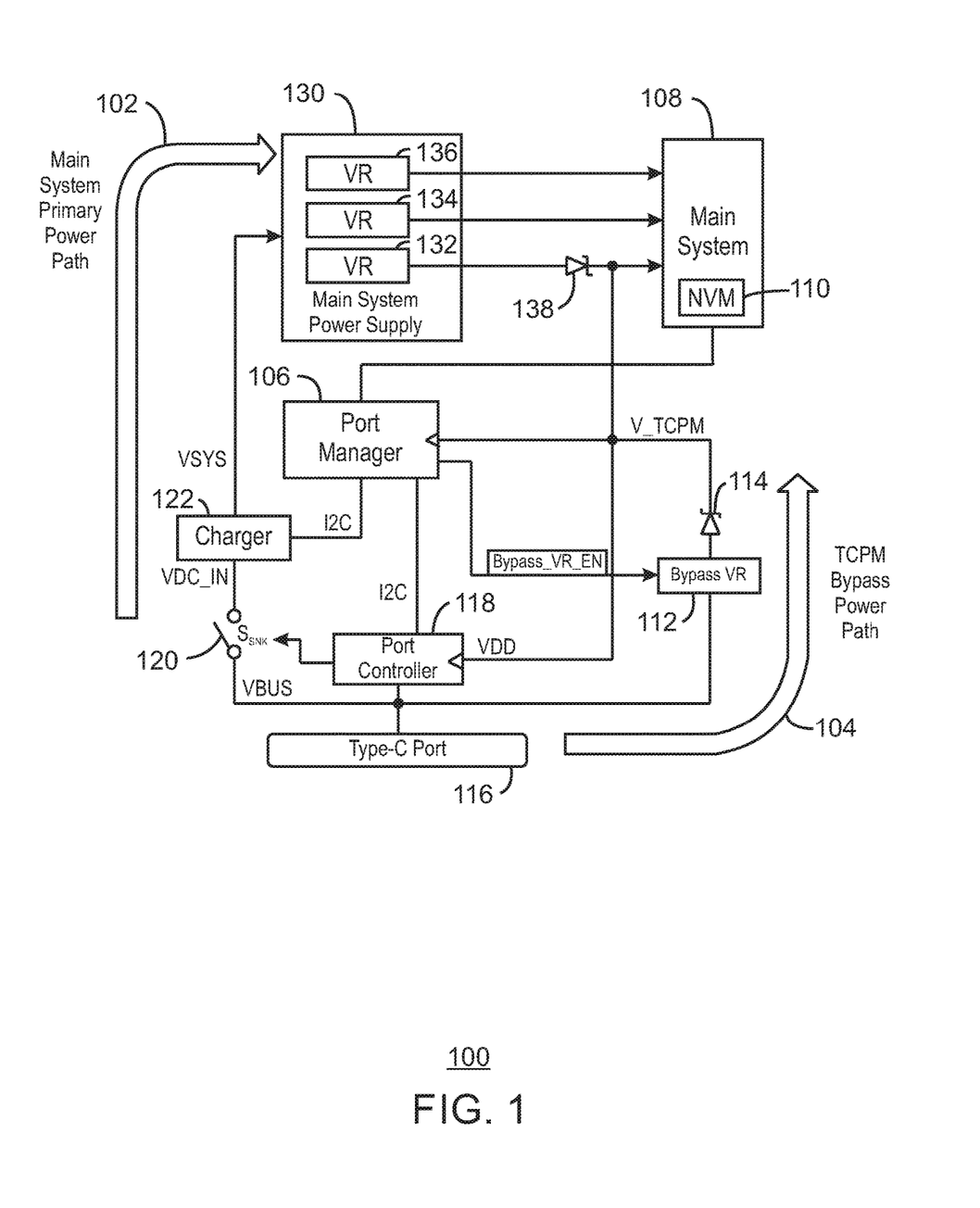
FIG. 1 illustrates a power delivery system.

FIG. 1 illustrates a power delivery system 100 with two separate power paths 102 and 104. Power delivery system 100 can include a port manager 106 (for example, a Type-C port manager or TCPM, and/or an embedded controller) and a main system 108. Main system 108 can include non-volatile memory (NVM) 110 (for example, in some embodiments, flash memory 110). Power delivery system 100 can additionally include a bypass voltage regulator 112 and a Zener diode 114.

In some embodiments, the main system 108 can include a host processor, a host chipset, memory and/or storage. In some embodiments, the main system 108 can include an SoC (system on a chip), memory, and/or storage.

In some embodiments, port manager 106 can be included in an embedded controller. In some embodiments, port manager 106 can be included in an embedded controller outside the main system, and/or outside the host processor and/or outside the host chipset. In some embodiments, the port manager can access non-volatile memory 110 (for example, flash) using SPI (Serial Peripheral Interface) and/or using eSPI (Enhanced Serial Peripheral Interface).

Power delivery system 100 can include a primary power path 102 that supplies power to the main system, and a bypass power path 104 that supplies power to port manager 106 (for example, a Type-C port manager or TCPM). In some embodiments, the power delivery system 100 is a sink device that is coupled via a USB type-C connector to a source device. In some embodiments, port manager 106 can be an embedded controller. In some embodiments, the bypass power path 104 can also supply power to other lower power components in the main system 108. The port manager 106 can access non-volatile memory (NVM) 110 (for example, flash memory) in the main system 108 (for example, through a main system master attached flash architecture). In order to load the software from the non-volatile memory 110, the main system 108 may need to be powered and pass software from the non-volatile memory 110 of the main system 108 to the port manager 106.

A bypass voltage regulator (VR) 112 can receive voltage VBUS as an input signal and can power the port manager 106 when in a sink standby mode (for example, in a USB sink standby mode). The bypass VR (voltage regulator) 112 can be turned off by default and can be turned on by an embedded controller such as the port manager 106 (for example, TCPM) before entering the sink standby mode (and/or upon entering the sink standby mode). In some embodiments, Zener diode 114 is included between the bypass voltage regulator 112 and the port manager 106 in order to help regulate voltage.

In some embodiments, power delivery system 100 can be attached to another device (for example, as a sink) via a USB type-C port 116. A voltage regulator bypass pin, voltage regulator bypass signal, and/or voltage regulator bypass message (for example, Bypass_VR_EN) can be provided by port manager 106 (for example, a type-C port manager or TCPM) to the bypass voltage regulator (bypass VR) 112 and can be de-asserted by default to disable the bypass VR (voltage regulator) 112. In some embodiments, a voltage regulator bypass pin, voltage regulator bypass signal, and/or voltage regulator bypass message such as, for example, Bypass_VR_EN, can be an actual wire or a virtual signal. A port controller 118 (for example, a type-C port controller or TCPC) can turn on an $S_{SNK}$ signal to control a switch 120 that can provide the VBUS voltage (for example, as a VDC_IN voltage) to a charger 122 (for example, this can occur by default).

In some embodiments, port manager 106 can be coupled to port controller 118 via an I2C protocol connection. In some embodiments, port manager 106 can be coupled to port controller 118 via any other type of interface, protocol, etc. For example, in some embodiments port manager 106 may be coupled to port controller 118 using SPI (Serial Peripheral Interface), eSPI (Enhanced Serial Peripheral Interface), SMBUS (System Management Bus), UART (Universal Asynchronous Receiver/Transmitter), and/or some other type of interface or protocol, etc. In some embodiments, port manager 106 can be coupled to charger 122 via an I2C protocol connection. In some embodiments, port manager 106 can be coupled to charger 122 via any other type of interface, protocol, etc. For example, in some embodiments port manager 106 may be coupled to port controller 118 using SPI (Serial Peripheral Interface), eSPI (Enhanced Serial Peripheral Interface), SMBUS (System Management Bus), UART (Universal Asynchronous Receiver/Transmitter), and/or some other type of interface or protocol, etc.

The port manager 106 can initialize and load software from the non-volatile memory (NVM) 110 of the main system 108. Under a dead battery condition (for example, when a battery of the system has been removed, is completely depleted, and/or is unable to power more than a very small portion of the system), the port manager 106 may decide to negotiate for the high voltage bus VBUS. The port manager 106 can assert the bypass voltage regulator enable signal (Bypass_VR_EN) and enable the bypass VR (voltage regulator) 112. The port manager 106 can also de-assert the bypass voltage regulator enable signal (Bypass_VR_EN) and disable the bypass VR (voltage regulator) 112. The port manager 106 can send a request for the high VBUS voltage. The port manager can use the port controller 118 to turn off the $S_{SNK}$ signal in order to turn off the switch 120 so that the VBUS voltage is no longer provided to the charger 122. The port manager 106 can receive an accept message and can receive a PS_RDY message (for example, from a source device via port 116). The port manager 106 can use the port controller 118 to turn back on the $S_{SNK}$ signal to control the switch 120 to again provide the VBUS voltage as the VDC_IN signal to turn the charger 122 back on.

In some embodiments, sink standby is defined as the period between receiving the accept and PS_RDY messages (for example, from a source device). In some embodiments, the port manager 106 can turn on the bypass power path 104 and can also turn off the primary power path 102 in anticipation of receiving the accept message. In some embodiments, the main system primary power path 102 can include switch 120 (controlled by port manager 106 and/or by port controller 118), charger 122, and a main system power supply 130. In some embodiments, main system power supply 130 can include one or more voltage regulators (for example, voltage regulator 132, voltage regulator 134 and voltage regulator 136). In some embodiments, a Zener diode such as Zener diode 138 can be included between one or more of the voltage regulators 132, 134, 136 and main system 108, port manager 106 and/or port controller 118, for example, to help regulate voltage.

In some embodiments, power delivery system 100 first brings up the main system primary power path 102 to bring up the main system 108. The main system power up (for example, powers up the platform controller hub or PCH). Then firmware is loaded from the non-volatile memory 110 (for example, flash memory) to the port manager 106 (for example, using the PCH of the main system with attached flash, or using some other implementation). Once the firmware has been loaded to the port manager 106, the power delivery system 100 can go into a standby state (for example, during a dead battery situation). The main power path 102 can be turned off and the bypass power path 104 can be used. The port manager 106 can control the power states, since the bypass power path 104 can provide power to the port manager 106. In some embodiments, the power delivery system 100 can go into the standby state, turn off the main power path 102 and turn on the bypass power path 104 in other situations other than a dead battery condition.

Figure 2:
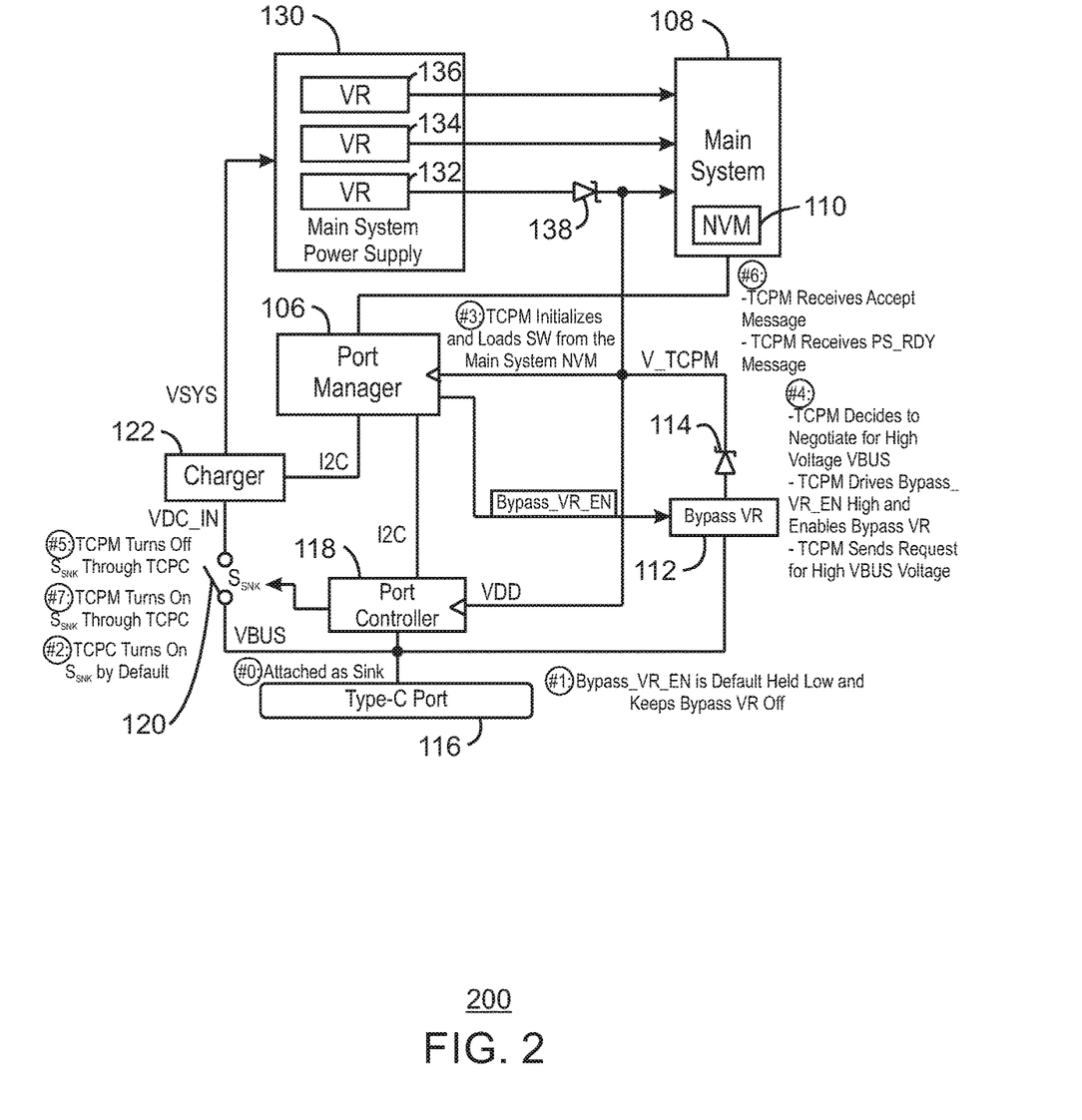
FIG. 2 illustrates a power delivery system.

FIG. 2 illustrates a power delivery system 200. In some embodiments, power deliver system 200 is the same as and/or is similar to power delivery system 100 of FIG. 1. FIG. 2 illustrates example sequences of a power delivery negotiation for high voltage VBUS under a dead battery condition according to some embodiments. The sequences are illustrated in order as #0, #1, #2, #3, #4, #5, #6, #7 in FIG. 2.

Figure 3:
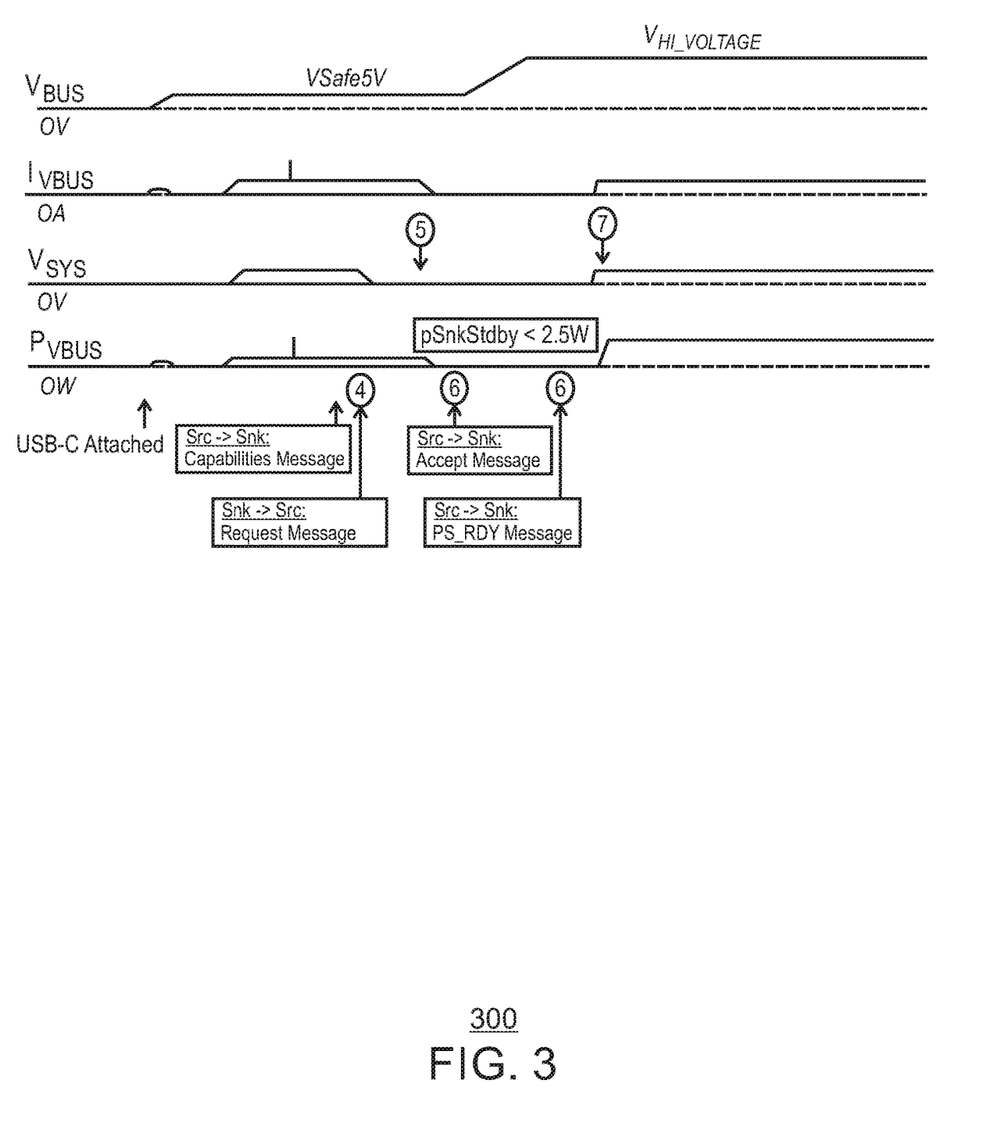
FIG. 3 illustrates a timing diagram.

FIG. 3 illustrates a timing diagram 300. In some embodiments, timing diagram 300 corresponds to similar example sequences illustrated in reference to power delivery system 200 in FIG. 2. Timing diagram 300 illustrates example sequences of a power delivery negotiation for high voltage VBUS under a dead battery condition according to some embodiments. In some embodiments, circled example sequence numbers in FIG. 3 (for example, 4, 5, 6 and 7 in FIG. 3) respectively correspond to the circled example sequence numbers in FIG. 2 (for example, #4, #5, #6, #7 in FIG. 2).

As illustrated in FIG. 3, in order to go from a safe 5 volts (VBUS is VSafe5V) to a higher voltage ($V_{HI\_VOLTAGE}$), the power system needs to transition through a stage where peak power $P_{VBUS}$ needs to stay at or below 2.5 watts. In order to maintain this power level less than 2.5 W while increasing the voltage to the high voltage, the main power path needs to be turned off. The system relies on the bypass power path to maintain the appropriate port manager power states.

In some embodiments, the steps #0, #1, #2, etc. in FIG. 2 describe particular embodiments. For example, they refer to a TCPM and TCPC, which relates to embodiments where port manager 106 is a TCPM and port controller 118 is a TCPC. However, in some embodiments, these steps need to be performed by a TCPM or a TCPC and could be performed by port manager 106 and/or port controller 118, for example. In a step #0, power delivery system 200 can be attached to another device as a sink via the USB type-C port 116. In a step #1, a voltage regulator bypass signal Bypass_VR_EN provided by the port manager 106 (for example, a type-C port manager or TCPM) to the bypass voltage regulator 112 (bypass VR) is de-asserted by default to disable the bypass VR 112. In a step #2, the port controller 112 (for example, a type-C port controller or TCPC) and/or the port manager 106 can turn on an $S_{SNK}$ signal to control the switch 120 to provide the VBUS voltage as a VDC_IN voltage to the charger 122 (for example, this can occur by default). In a step #3, the port manager 106 can initialize and load software from the non-volatile memory (NVM) 110 of the main system 108. Prior to step #4, in some embodiments, the source may send a capabilities message to the sink, as illustrated in FIG. 3. In a step #4, for example, under a dead battery condition, the port manager 106 can decide to negotiate for the high voltage bus VBUS, the port manager 106 can assert the bypass voltage regulator enable signal (Bypass_VR_EN) and enable the bypass VR 112. In step #4 the port manager 106 can also send a request message (for example, to the source via port 116) for the high VBUS voltage. In a step #5, the port manager 106 can use the port controller 118 to turn off the $S_{SNK}$ signal to turn off the switch 120 so that the VBUS voltage is no longer provided to the charger 122. In a step #6, the port manager 106 can receive an accept message and/or a PS_RDY message (for example, from a source via port 116). In a step 7, the port manager can use the port controller 118 to turn back on the $S_{SNK}$ signal to control the switch 120 to again provide the VBUS voltage as the VDC_IN signal to turn the charger 122 back on.

In some embodiments, sink standby is defined as the period between receiving the accept and PS_RDY messages (in step 6). In some embodiments, the port manager 106 can turn on the bypass power path 104 in step 4 and can turn off the primary power path 102 in step 5 in anticipation of receiving the accept message in step 6.

Figure 4:
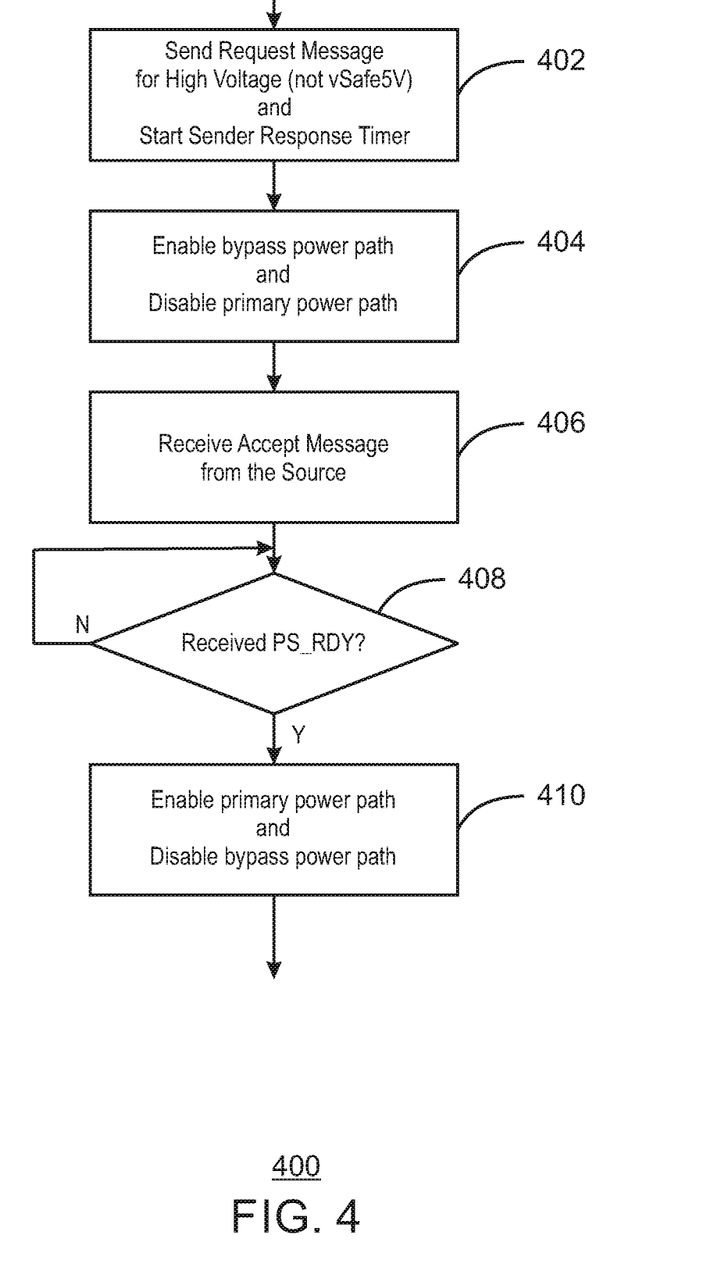
FIG. 4 illustrates power delivery flow.

FIG. 4 illustrates a flow chart 400 according to some embodiments. In some embodiments, flow chart 400 illustrates a flow that is part of a power delivery negotiation function in a port manager (for example, in a TCPM, and/or in a port manager such as port manager 106, and/or in a TCPC, and/or in a port controller such as port controller 118). In some embodiments, flow 400 can be implemented in a processor. In some embodiments, flow 400 can be implemented as instructions stored on one or more tangible, non-transitory computer readable media that are machine readable (for example, instructions that can be read by a processor and cause a processor to perform functions of FIG. 4).

In some embodiments, at box 402 a request message for high voltage (not a vSafe5V signal, for example) is sent (for example, to a source), and a sender response timer is started. At 404 a bypass power path is enabled and a primary power path is disabled. For example, in some embodiments, block 404 implements step #4 and/or a step similar to step #4 as described in reference to FIG. 2 and FIG. 3. At 406 an accept message is received from the source. Once a power source ready signal (PS_RDY) has been received at 408 (for example, from the source), the primary power path is enabled and the bypass power path is disabled at 410. In some embodiments, block 408 implements a portion of step #6 as described herein, for example.

In some embodiments, a bypass power path is enabled (for example, by asserting a bypass VR (voltage regulator) enable signal such as a Bypass_VR_EN signal). In some embodiments, a primary power path is disabled (for example, by turning off a sink path switch signal such as a sink path switch signal $S_{SNK}$) using a port controller (for example, a TCPC). In some embodiments, the primary power path is disabled immediately after (or before, or simultaneously with) sending a request message for a high voltage bus (for example, VBUS).

In some embodiments, a bypass power path is disabled (for example, by de-asserting a bypass VR (voltage regulator) enable signal such as a Bypass_VR_EN signal). In some embodiments, a primary power path is enabled (for example, by turning on a sink path switch signal $S_{SNK}$ using a port controller such as a TCPC). In some embodiments, the primary power path is enabled after receiving a signal indicating that a power source is ready (for example, using a PS_RDY signal).

At box 402, a request message is sent for high voltage (not vSafe5V) and a sender response timer (such as, for example, a SenderResponseTimer as specified in the USB Power Delivery Specification) is started. At box 404, a bypass power path is enabled and a primary power path is disabled. At box 406, an accept message is received (for example, from a source). At decision diamond 408, a decision is made as to whether PS_RDY has been received. At box 410, the primary power path is again enabled and the bypass power path is disabled. In some embodiments, if a sender response timer (such as a SenderResponseTimer) expires during flow of any of the boxes in FIG. 4, flow can be ended and/or flow can be returned to the beginning of box 402.

In some embodiments, port management (for example, USB Type-C port management) and/or port control (for example, USB Type-C port control) is implemented. In some embodiments, a main system is accessed during port manager (for example, USB Type-C port manager) boot. In some embodiments, port management and/or port control is not implemented during a sink standby mode maintain state. In some embodiments, a power requirement of a main system is higher than a sink standby power specification limit (for example, a USB sink standby power specification limit of 2.5 W).

In some embodiments, a bypass power path is implemented. In some embodiments, a primary power path is on and then is turned off when a power delivery negotiation for high voltage is implemented (for example, due to a dead battery condition). In some embodiments, a bypass power path is used to help solve a USB power delivery dead battery situation.

In some embodiments, an embedded controller is used to run a port manager (for example, a USB Type-C port manager). In some embodiments, a port manager is used to access non-volatile memory of a main system. In some embodiments, a port manager is used to access a master-attached flash configuration of a main system.

In some embodiments, a port manager such as a TCPM can be implemented in an embedded controller. In some embodiments, implementing a port manager in an embedded controller can reduce cost, since an additionally microcontroller for port manager function may not be necessary. In some embodiments, a port manager such as a TCPM can share flash of a platform controller hub (PCH) of a main system. This can be implemented, for example, using a master-attached configuration, which can be a cost saving opportunity.

In some embodiments, a port manager such as a TCPM can be implemented in a compute device in a main system (for example, a compute device in an SoC). In some embodiments, a port manager such as a TCPM can be implemented in a hub such as an integrated sensor hub (ISH) where the non-volatile memory can be accessed through a security agent. In some embodiments, a port manager such as a TCPM can be implemented as a software driver in a processor. In some embodiments, a port manager such as a TCPM can be implemented as firmware in one of the co-processors in the host chipset, for example.

Some embodiments have been illustrated and described herein as occurring on a sink side (for example, in some embodiments, system 100 is described as occurring on a sink side). However, in some embodiments, system 100 could be used to implement a source side.

Figure 5:
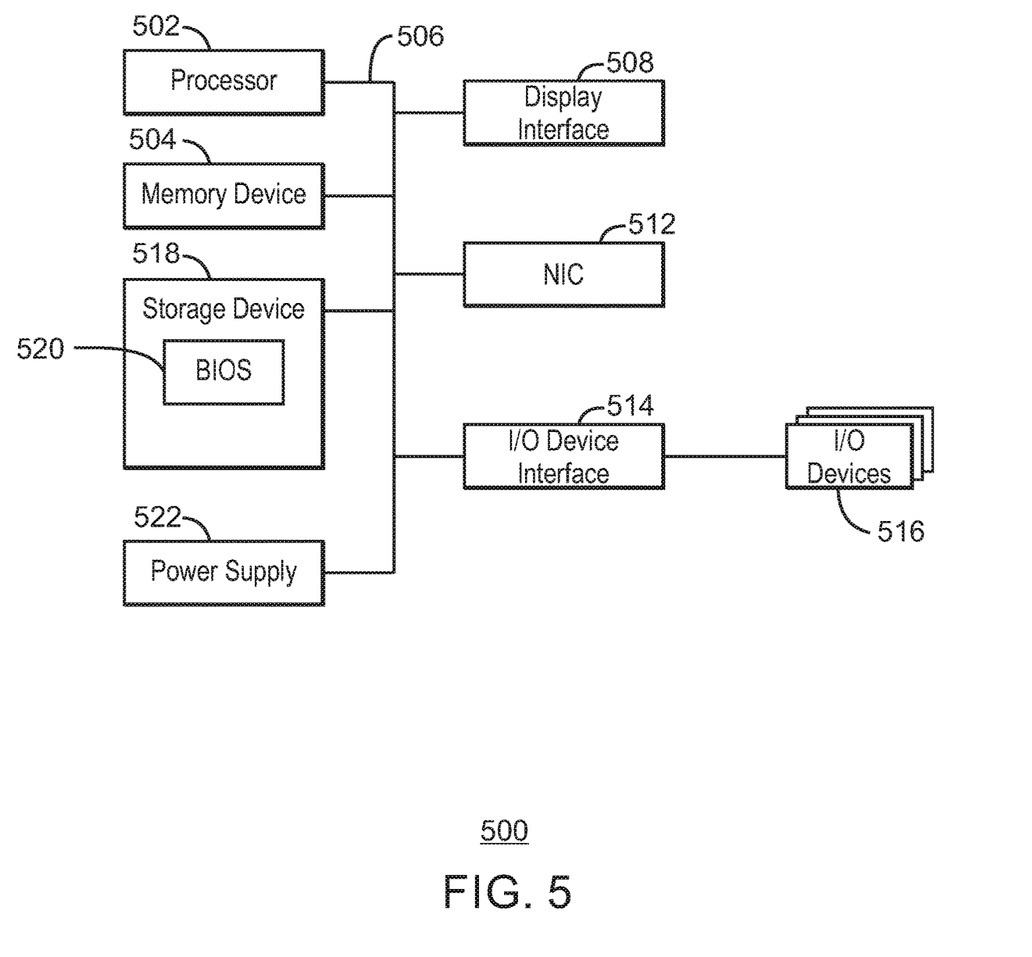
FIG. 5 illustrates a block diagram of a computing device.

FIG. 5 is a block diagram of an example of a computing device 500 that can include power management, power delivery and/or power supply according to some embodiments. In some embodiments, any portion of the circuits and/or systems illustrated in any one or more of the figures, and any of the embodiments described herein can be included in and/or be implemented by computing device 500. The computing device 500 may be, for example, a mobile phone, mobile device, handset, laptop computer, desktop computer, or tablet computer, among others. The computing device 500 may include a processor 502 that is adapted to execute stored instructions, as well as a memory device 504 (and/or storage device 504) that stores instructions that are executable by the processor 502. The processor 502 can be a single core processor, a multi-core processor, a computing cluster, or any number of other configurations. For example, processor 502 can be an Intel® processor such as an Intel® Celeron, Pentium, Core, Core i3, Core i5, or Core i7 processor. In some embodiments, processor 502 can be an Intel® x86 based processor. In some embodiments, processor 502 can be an ARM based processor. The memory device 504 can be a memory device and/or a storage device, and can include volatile storage, non-volatile storage, random access memory, read only memory, flash memory, or any other suitable memory or storage systems. The instructions that are executed by the processor 502 may also be used to implement power supply, power delivery, power management, and/or power path management (for example, under a dead battery condition) as described in this specification.

The processor 502 may also be linked through the system interconnect 506 (e.g., PCI®, PCI-Express®, NuBus, etc.) to a display interface 508 adapted to connect the computing device 500 to a display device. The display device (not shown) may include a display screen that is a built-in component of the computing device 500. The display device may also include a computer monitor, television, or projector, among others, that is externally connected to the computing device 500.

In some embodiments, the display interface 508 can include any suitable graphics processing unit, transmitter, port, physical interconnect, and the like. In some examples, the display interface 508 can implement any suitable protocol for transmitting data to the display device. For example, the display interface 508 can transmit data using a high-definition multimedia interface (HDMI) protocol, a DisplayPort protocol, or some other protocol or communication link, and the like In addition, a network interface controller (also referred to herein as a NIC) 512 may be adapted to connect the computing device 500 through the system interconnect 506 to a network (not depicted). The network (not depicted) may be a cellular network, a radio network, a wide area network (WAN), a local area network (LAN), or the Internet, among others.

The processor 502 may be connected through system interconnect 506 to an input/output (I/O) device interface 514 adapted to connect the computing host device 500 to one or more I/O devices 516. The I/O devices 516 may include, for example, a keyboard and/or a pointing device, where the pointing device may include a touchpad or a touchscreen, among others. The I/O devices 516 may be built-in components of the computing device 500, or may be devices that are externally connected to the computing device 500.

In some embodiments, the processor 502 may also be linked through the system interconnect 506 to a storage device 518 that can include a hard drive, a solid state drive (SSD), a magnetic drive, an optical drive, a USB flash drive, an array of drives, or any other type of storage, including combinations thereof. In some embodiments, the storage device 518 can include any suitable applications. In some embodiments, the storage device 518 can include a basic input/output system (BIOS) 520.

In some embodiments, a power supply 522 (for example providing power supply, and/or power delivery, and/or power management, and/or power control and/or port control, for example) is provided. In some embodiments, power supply 522 can be a part of system 500, and in some embodiments, power supply 522 can be external to the rest of system 500. In some embodiments, power supply 522 can provide any of the power related techniques described herein. For example, in some embodiments, power supply 522 can provide power delivery and/or power management as described in reference to and/or illustrated in any of the drawings herein. In some embodiments, for example, power supply 522 includes one or more elements of FIG. 1 and FIG. 2 such as, for example, port manager 106, bypass VR 112, Zener diode 114, port 116, port controller 118, switch 120, charger 122, and/or power supply 130, etc.

It is to be understood that the block diagram of FIG. 5 is not intended to indicate that the computing device 500 is to include all of the components shown in FIG. 5. Rather, the computing device 500 can include fewer or additional components not illustrated in FIG. 5 (e.g., additional memory components, embedded controllers, additional modules, additional network interfaces, etc.). Furthermore, any of the functionalities of the power supply 522 may be partially, or entirely, implemented in hardware and/or in the processor 502. For example, the functionality may be implemented with an application specific integrated circuit, logic implemented in an embedded controller, or in logic implemented in the processor 502, among others. In some embodiments, the functionalities of the power supply 522 can be implemented with logic, wherein the logic, as referred to herein, can include any suitable hardware (e.g., a processor, among others), software (e.g., an application, among others), firmware, or any suitable combination of hardware, software, and firmware.

Figure 6:
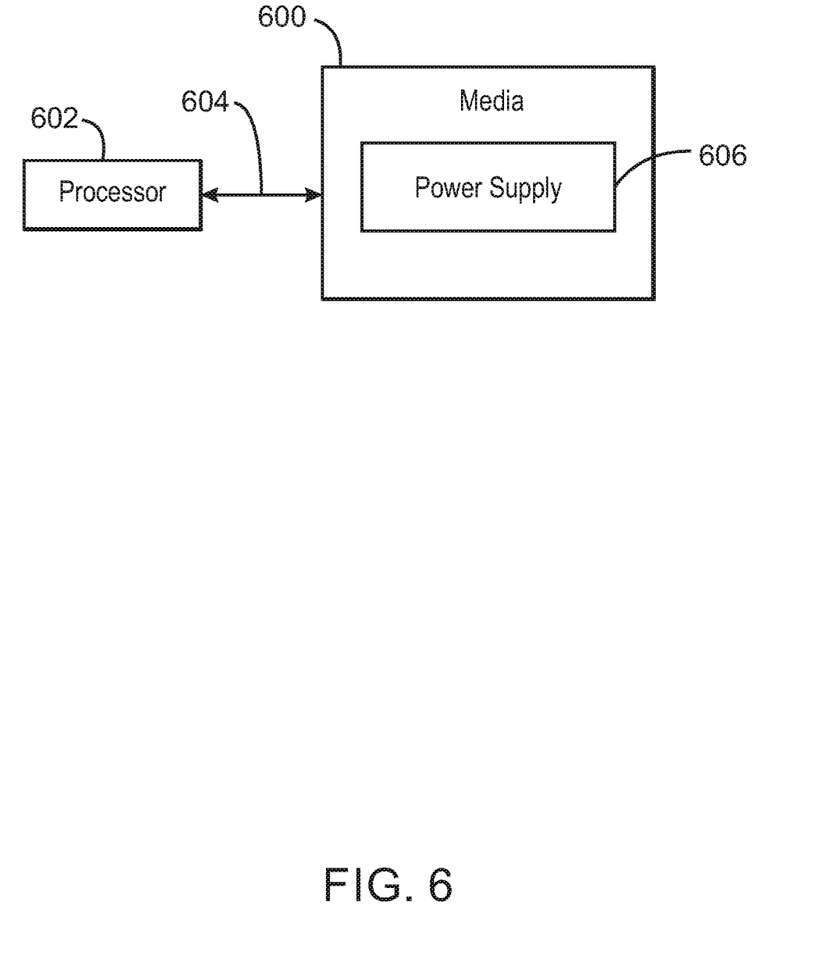
FIG. 6 illustrates one or more processors and one or more media.

FIG. 6 is a block diagram of an example of one or more processors and one or more tangible, non-transitory computer readable media for power supply, power delivery, power management, power path switching, etc. The one or more tangible, non-transitory, computer-readable media 600 may be accessed by the processor(s) 602 over a computer interconnect 604. Furthermore, the one or more tangible, non-transitory, computer-readable media 600 may include code to direct the processor(s) 602 to perform operations as described herein. In some embodiments, processor 602 is one or more processors. In some embodiments, processor 602 can perform some or all of the same functions that can be performed by other elements described herein using instructions (code) included on media 600 (for example, some or all of the functions of port manager 106 and/or some or all of the functions of port controller 118).

Various components discussed in this specification may be implemented using software components. These software components may be stored on the one or more tangible, non-transitory, computer-readable media 600, as indicated in FIG. 6. For example, power supply 606 (for example, power supply, power delivery, power management, power path management, etc.) may be adapted to direct the processor 602 to perform one or more of any of the operations described in this specification and/or in reference to the drawings.

It is to be understood that any suitable number of the software components shown in FIG. 6 may be included within the one or more tangible, non-transitory computer-readable media 600. Furthermore, any number of additional software components not shown in FIG. 6 may be included within the one or more tangible, non-transitory, computer-readable media 600, depending on the specific application.

Reference in the specification to "one embodiment" or "an embodiment" or "some embodiments" of the disclosed subject matter means that a particular feature, structure, or characteristic described in connection with the embodiment is included in at least one embodiment of the disclosed subject matter. Thus, the phrase "in one embodiment" or "in some embodiments" may appear in various places throughout the specification, but the phrase may not necessarily refer to the same embodiment or embodiments.

Example 1

In some examples, a power delivery system includes a primary power path to provide power to a computing system. The power delivery system also includes a bypass power path. A port manager is to disable the primary power path and to enable the bypass power path in response to a dead battery condition.

Example 2

In some examples, the power delivery system of EXAMPLE 1, where the battery. condition is a battery condition indicating a lack of ability of a battery to power the computing system

Example 3

In some examples, the power delivery system of EXAMPLE 1, where the power delivery system is a Universal Serial Bus (USB) power delivery system.

Example 4

In some examples, the power delivery system of EXAMPLE 1, including a bypass voltage regulator to provide power to the port manager in response to Universal Serial Bus VBUS as the only power source to the bypass power path.

Example 5

In some examples, the power delivery system of EXAMPLE 1, the bypass power path including a bypass voltage regulator to provide power to the port manager.

Example 6

In some examples, the power delivery system of EXAMPLE 1, the port manager to receive instructions stored in a non-volatile memory in the computing system.

Example 7

In some examples, the power delivery system of EXAMPLE 1, the port manager to maintain power drawn by the computing system to be less than a standby power limit.

Example 8

In some examples, the power delivery system of EXAMPLE 7, where the standby power limit is a Universal Serial Bus standby power limit.

Example 9

In some examples, the power delivery system of EXAMPLE 8, wherein the Universal Serial Bus standby power limit is 2.5 Watts.

Example 10

In some examples, the power delivery system of EXAMPLE 1, where the bypass power path is to power the port manager.

Example 11

In some examples, the power delivery system of EXAMPLE 1, including a port to couple the power delivery system to a source.

Example 12

In some examples, the power delivery system of EXAMPLE 1, including a port controller to turn on the main power path to supply power to the computing system in a default mode.

Example 13

In some examples, the power delivery system of EXAMPLE 1, the port manager to disable the bypass power path and to enable the primary power path when primary power is available.

Example 14

In some examples, a power delivery method includes enabling a primary power path to provide power to a computing system, receiving instructions from the computing system, disabling the primary power path in response to a battery condition, and enabling a bypass power path in response to the battery condition.

Example 15

In some examples, the power delivery method of EXAMPLE 14, including providing power on the bypass power path in response to Universal Serial Bus VBUS as the only power source.

Example 16

In some examples, the power delivery method of EXAMPLE 14, where the instructions to be received from the computing system are stored in a non-volatile memory in the computing system.

Example 17

In some examples, the power delivery method of EXAMPLE 14, including maintaining power drawn by the computing system to be less than a standby power limit.

Example 18

In some examples, the power delivery method of EXAMPLE 17, where the standby power limit is a Universal Serial Bus standby power limit.

Example 19

In some examples, the power delivery method of EXAMPLE 18, where the Universal Serial Bus standby power limit is 2.5 Watts.

Example 20

In some examples, the power delivery method of EXAMPLE 14, including, in response to primary power being available, disabling the bypass power path and enabling the primary power path.

Example 21

In some examples, one or more tangible, non-transitory computer readable media include a plurality of instructions that, in response to being executed on one or more processors, cause the one or more processors to enable a primary power path to provide power to a computing system, receive instructions from the computing system, disable the primary power path in response to a battery condition, and enable a bypass power path in response to the battery condition.

Example 22

In some examples, the one or more tangible, non-transitory computer readable media of EXAMPLE 21, including a plurality of instructions that, in response to being executed on the one or more processors, cause the one or more processors to provide power on the bypass power path in response to Universal Serial Bus VBUS as the only power source.

Example 23

In some examples, the one or more tangible, non-transitory computer readable media of EXAMPLE 21, including a plurality of instructions that, in response to being executed on the one or more processors, cause the one or more processors to maintain power drawn by the computing system to be less than a standby power limit.

Example 24

In some examples, the one or more tangible, non-transitory computer readable media of EXAMPLE 23, where the standby power limit is a Universal Serial Bus standby power limit.

Example 25

In some examples, the one or more tangible, non-transitory computer readable media of EXAMPLE 24, where the Universal Serial Bus standby power limit is 2.5 Watts.

Example 26

In some examples, the one or more tangible, non-transitory computer readable media of EXAMPLE 21, including a plurality of instructions that, in response to being executed on the one or more processors, cause the one or more processors to, in response to primary power being available, disable the bypass power path and, in response to primary power being available, enable the primary power path.

Example 27

In some examples, a power delivery system includes a primary power path to provide power to a computing system. The power delivery system also includes a bypass power path. A port manager is to disable the primary power path and to enable the bypass power path in response to a dead battery condition.

Example 28

In some examples, the power delivery system of EXAMPLE 27, where the battery. condition is a battery condition indicating a lack of ability of a battery to power the computing system Example 29

In some examples, the power delivery system of EXAMPLE 27, where the power delivery system is a Universal Serial Bus (USB) power delivery system.

Example 30

In some examples, the power delivery system of EXAMPLE 27, including a bypass voltage regulator to provide power to the port manager in response to Universal Serial Bus VBUS as the only power source to the bypass power path.

Example 31

In some examples, the power delivery system of EXAMPLE 27, the bypass power path including a bypass voltage regulator to provide power to the port manager.

Example 32

In some examples, the power delivery system of EXAMPLE 27, the port manager to receive instructions stored in a non-volatile memory in the computing system.

Example 33

In some examples, the power delivery system of EXAMPLE 27, the port manager to maintain power drawn by the computing system to be less than a standby power limit.

Example 34

In some examples, the power delivery system of EXAMPLE 33, where the standby power limit is a Universal Serial Bus standby power limit.

Example 35

In some examples, the power delivery system of EXAMPLE 34, wherein the Universal Serial Bus standby power limit is 2.5 Watts.

Example 36

In some examples, the power delivery system of EXAMPLE 27, where the bypass power path is to power the port manager.

Example 37

In some examples, the power delivery system of EXAMPLE 1, including a port to couple the power delivery system to a source.

Example 38

In some examples, the power delivery system of EXAMPLE 27, including a port controller to turn on the main power path to supply power to the computing system in a default mode.

Example 39

In some examples, the power delivery system of any of EXAMPLES 27-38, the port manager to disable the bypass power path and to enable the primary power path when primary power is available.

Example 40

In some examples, a power delivery method includes enabling a primary power path to provide power to a computing system, receiving instructions from the computing system, disabling the primary power path in response to a battery condition, and enabling a bypass power path in response to the battery condition.

Example 41

In some examples, the power delivery method of EXAMPLE 40, including providing power on the bypass power path in response to Universal Serial Bus VBUS as the only power source.

Example 42

In some examples, the power delivery method of EXAMPLE 40, where the instructions to be received from the computing system are stored in a non-volatile memory in the computing system.

Example 43

In some examples, the power delivery method of EXAMPLE 40, including maintaining power drawn by the computing system to be less than a standby power limit.

Example 44

In some examples, the power delivery method of EXAMPLE 43, where the standby power limit is a Universal Serial Bus standby power limit.

Example 45

In some examples, the power delivery method of EXAMPLE 44, where the Universal Serial Bus standby power limit is 2.5 Watts.

Example 46

In some examples, the power delivery method of any of EXAMPLES 40-45, including, in response to primary power being available, disabling the bypass power path and enabling the primary power path.

Example 47

In some examples, one or more tangible, non-transitory computer readable media include a plurality of instructions that, in response to being executed on one or more processors, cause the one or more processors to enable a primary power path to provide power to a computing system, receive instructions from the computing system, disable the primary power path in response to a battery condition, and enable a bypass power path in response to the battery condition.

Example 48

In some examples, the one or more tangible, non-transitory computer readable media of EXAMPLE 47, including a plurality of instructions that, in response to being executed on the one or more processors, cause the one or more processors to provide power on the bypass power path in response to Universal Serial Bus VBUS as the only power source.

Example 49

In some examples, the one or more tangible, non-transitory computer readable media of EXAMPLE 47, including a plurality of instructions that, in response to being executed on the one or more processors, cause the one or more processors to maintain power drawn by the computing system to be less than a standby power limit.

Example 50

In some examples, the one or more tangible, non-transitory computer readable media of EXAMPLE 49, where the standby power limit is a Universal Serial Bus standby power limit (for example, in some EXAMPLES, 2.5 watts).

Example 51

In some examples, the one or more tangible, non-transitory computer readable media of any of EXAMPLES 47-50, including a plurality of instructions that, in response to being executed on the one or more processors, cause the one or more processors to, in response to primary power being available, disable the bypass power path and, in response to primary power being available, enable the primary power path.

Example 52

In some examples, a power delivery method includes enabling a primary power path to provide power to a computing system. disabling the primary power path in response to a battery condition, and enabling a bypass power path in response to the battery condition.

Example 53

In some examples, the power delivery method of any preceding EXAMPLE, where the battery condition is a battery condition indicating a lack of ability of a battery to power the computing system.

Example 54

In some examples, the power delivery method of any preceding EXAMPLE, where the power delivery system is a Universal Serial Bus power delivery system.

Example 55

In some examples, the power delivery method of any preceding EXAMPLE, including providing bypass voltage regulation to provide power in response to Universal Serial Bus VBUS as the only power source to the bypass power path.

Example 56

In some examples, the power delivery method of any preceding EXAMPLE, the bypass power path providing bypass voltage regulation.

Example 57

In some examples, the power delivery method of any preceding EXAMPLE, including receiving instructions stored in a non-volatile memory in the computing system.

Example 58

In some examples, the power delivery method of any preceding EXAMPLE, including maintaining power drawn by the computing system to be less than a standby power limit.

Example 59

In some examples, the power delivery method of EXAMPLE 58, where the standby power limit is a Universal Serial Bus standby power limit.

Example 60

In some examples, the power delivery method of EXAMPLE 59, where the Universal Serial Bus standby power limit is 2.5 Watts.

Example 61

In some examples, the power delivery method of any preceding EXAMPLE, where the bypass power path is to power the enabling.

Example 62

In some examples, the power delivery method of any preceding EXAMPLE, including coupling to a source.

Example 63

In some examples, the power delivery method of any preceding EXAMPLE, including turning on the main power path to supply power to the computing system in a default mode.

Example 64

In some examples, the power delivery method of any preceding EXAMPLE, including, when primary power is available, disabling the bypass power path and enabling the primary power path.

Example 65

In some examples, an apparatus including means to perform a method as claimed in any preceding EXAMPLE.

Example 66

In some examples, machine-readable storage including machine-readable instructions, when executed, to implement a method or realize an apparatus as in any preceding EXAMPLE.

Although example embodiments of the disclosed subject matter are described with reference to circuit diagrams, flow diagrams, block diagrams etc. in the drawings, persons of ordinary skill in the art will readily appreciate that many other ways of implementing the disclosed subject matter may alternatively be used. For example, the arrangements of the elements in the diagrams, and/or the order of execution of the blocks in the diagrams may be changed, and/or some of the circuit elements in circuit diagrams, and blocks in block/flow diagrams described may be changed, eliminated, or combined. Any elements as illustrated and/or described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, one or more volatile and/or non-volatile memory devices, such as storage devices and/or an associated machine readable or machine accessible medium including solid-state memory, harddrives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter. For example, in each illustrated embodiment and each described embodiment, it is to be understood that the diagrams of the figures and the description herein is not intended to indicate that the illustrated or described devices include all of the components shown in a particular figure or described in reference to a particular figure. In addition, each element may be implemented with logic, wherein the logic, as referred to herein, can include any suitable hardware (e.g., a processor, among others), software (e.g., an application, among others), firmware, or any suitable combination of hardware, software, and firmware, for example.

What is claimed is:

1. A power delivery system, comprising:
   a computing system;
   a primary power path between a port and the computing system, the primary power path to provide power to the computing system;
   a bypass power path between the port and a port manager, the port manager to disable the primary power path and to enable the bypass power path in response to a battery condition.
2. The power delivery system of claim 1, wherein the battery condition is a battery condition indicating a lack of ability of a battery to power the computing system.
3. The power delivery system of claim 1, comprising a bypass voltage regulator to provide power to the port manager in response to Universal Serial Bus VBUS as the only power source to the bypass power path.
4. The power delivery system of claim 1, the bypass power path including a bypass voltage regulator to provide power to the port manager.
5. The power delivery system of claim 1, the port manager to maintain power drawn by the computing system to be less than a standby power limit.
6. The power delivery system of claim 1, wherein the bypass power path is to power the port manager.
7. The power delivery system of claim 1, comprising a port controller to turn on the main power path to supply power to the computing system in a default mode.
8. The power delivery system of claim 1, the port manager to disable the bypass power path and to enable the primary power path when primary power is available.
9. The power delivery system of claim 1, the port manager to access non-volatile memory of the computing system.
10. The power delivery system of claim 1, the port manager to load firmware from non-volatile memory of the computing system.
11. The power delivery system of claim 1, the port manager to access non-volatile memory of the computing system using Serial Peripheral Interface or Enhanced Serial Peripheral Interface.
12. The power delivery system of claim 1, the port manager to access non-volatile memory of the computing system using an attached flash architecture.
13. The power delivery system of claim 1, the port manager to load firmware from non-volatile memory of the computing system, the power manager to disable the primary power path after the firmware has been loaded to the port manager from the non-volatile memory of the computing system.
14. A power delivery method, comprising:
    enabling a primary power path between a port and a computing system, the primary power path to provide power to the computing system;
    disabling the primary power path in response to a battery condition; and
    enabling a bypass power path between the port and a port manager in response to the battery condition.
15. The power delivery method of claim 14, comprising providing power on the bypass power path in response to Universal Serial Bus VBUS as the only power source.
16. The power delivery method of claim 14, comprising maintaining power drawn by the computing system to be less than a standby power limit.
17. The power delivery method of claim 16, wherein the standby power limit is a Universal Serial Bus standby power limit.
18. The power delivery method of claim 17, wherein the Universal Serial Bus standby power limit is 2.5 Watts.
19. The power delivery method of claim 14, comprising, in response to primary power being available:
    disabling the bypass power path; and
    enabling the primary power path.
20. The method of claim 14, comprising loading firmware from non-volatile memory of the computing system.
21. The method of claim 20, comprising turning off the main power path and using the bypass power path after the firmware has been loaded.
22. The method of claim 14, comprising using a voltage at the port as the only input power source for the bypass power path.
23. The method of claim 14, comprising entering a sink standby mode when the bypass power path is enabled.
24. One or more tangible, non-transitory computer readable media comprising a plurality of instructions that, in response to being executed on one or more processors, cause the one or more processors to:
    enable a primary power path between a port and a computing system, the primary power path to provide power to the computing system;
    disable the primary power path in response to a battery condition; and
    enable a bypass power path between the port and a port manager in response to the battery condition.
25. The one or more tangible, non-transitory computer readable media of claim 24, comprising a plurality of instructions that, in response to being executed on the one or more processors, cause the one or more processors to:
    provide power on the bypass power path in response to Universal Serial Bus VBUS as the only power source.
26. The one or more tangible, non-transitory computer readable media of claim 24, comprising a plurality of instructions that, in response to being executed on the one or more processors, cause the one or more processors to:

maintain power drawn by the computing system to be less than a standby power limit.

27. The one or more tangible, non-transitory computer readable media of claim 26, wherein the standby power limit is a Universal Serial Bus standby power limit.

28. The one or more tangible, non-transitory computer readable media of claim 27, wherein the Universal Serial Bus standby power limit is 2.5 Watts.

29. The one or more tangible, non-transitory computer readable media of claim 24, comprising a plurality of instructions that, in response to being executed on the one or more processors, cause the one or more processors to:
   in response to primary power being available, disable the bypass power path; and
   in response to primary power being available, enable the primary power path.

30. The one or more tangible, non-transitory computer readable media of claim 24, comprising a plurality of instructions that, in response to being executed on the one or more processors, cause the one or more processors to:
   load firmware from non-volatile memory of the computing system.

31. The one or more tangible, non-transitory computer readable media of claim 30, comprising a plurality of instructions that, in response to being executed on the one or more processors, cause the one or more processors to:
   turn off the main power path and use the bypass power path after the firmware has been loaded.

32. The one or more tangible, non-transitory computer readable media of claim 24, comprising a plurality of instructions that, in response to being executed on the one or more processors, cause the one or more processors to:
   use a voltage at the port as the only input power source for the bypass power path.

33. The one or more tangible, non-transitory computer readable media of claim 24, comprising a plurality of instructions that, in response to being executed on the one or more processors, cause the one or more processors to:
   enter a sink standby mode when the bypass power path is enabled.

* * * * *